(12) United States Patent
Gettemy

(10) Patent No.: US 6,992,659 B2
(45) Date of Patent: Jan. 31, 2006

(54) HIGH TRANSPARENCY INTEGRATED ENCLOSURE TOUCH SCREEN ASSEMBLY FOR A PORTABLE HAND HELD DEVICE

(75) Inventor: Shawn R. Gettemy, San Jose, CA (US)

(73) Assignee: palmOne, Inc., Milpitas, CA (US)

( * ) Notice: Subject to any disclaimer, the term of this patent is extended or adjusted under 35 U.S.C. 154(b) by 304 days.

(21) Appl. No.: 09/863,788

(22) Filed: May 22, 2001

(65) Prior Publication Data

US 2002/0175901 A1 Nov. 28, 2002

(51) Int. Cl.
*G09G 5/00* (2006.01)

(52) U.S. Cl. .......................... 345/173; 345/175; 349/58

(58) Field of Classification Search ......... 345/173–176; 385/12–14; 349/58; 361/681, 729

See application file for complete search history.

(56) References Cited

U.S. PATENT DOCUMENTS

| | | | | |
|---|---|---|---|---|
| 5,233,502 A | * | 8/1993 | Beatty et al. ................ | 361/729 |
| 5,785,439 A | | 7/1998 | Bowen ........................ | 400/472 |
| 6,108,195 A | * | 8/2000 | Behl et al. ................... | 361/681 |
| 6,181,842 B1 | | 1/2001 | Francis et al. ................ | 385/14 |

FOREIGN PATENT DOCUMENTS

EP 0 668 569 A2 8/1995

* cited by examiner

*Primary Examiner*—Dennis-Doon Chow
*Assistant Examiner*—Srilakshmi K. Kumar
(74) *Attorney, Agent, or Firm*—Wagner, Murabito & Hao LLP

(57) ABSTRACT

An integrated enclosure/touch screen assembly. A touch screen assembly consisting of a display mechanism and optical sensor mechanism are enclosed within a single piece cover. The optical sensor mechanism consists of lens structure and optical sensor couple to the lens structure. The single piece cover includes a transparent top surface and the lens structure is embedded within the transparent top surface. The transparent top surface of the single piece cover provides an enclosure that is both dust free and waterproof.

The lens structure of the single piece cover functions by columnating light across the transparent surface. The optical touch sensor is coupled to the lens structure to register contact with the transparent surface via the lens structure by detecting disturbances in the columnated light. In one embodiment, the single piece cover is constructed by embedding the lens structure directly into the transparent surface. This process forms the single piece cover and also may be used to provide various shapes for the outer edges of the cover. The single piece cover eliminates exposed seams of the touch screen assembly. Additionally, the transparent surface is disposed directly above the display without any intervening layers, thereby improving the transmission of light to the display.

18 Claims, 5 Drawing Sheets

HIGH TRANSPARENCY INTEGRATED ENCLOSURE TOUCH SCREEN ASSEMBLY FOR A PORTABLE HAND HELD DEVICE

This application is related to commonly assigned U.S. application Ser. No. 09/774,990 entitled "INTEGRATED ENCLOSURE/TOUCH SCREEN ASSEMBLY".

TECHNICAL FIELD

The present invention relates to a system for implementing a touch screen display for a personal information device ("PID"). In particular, the present invention relates to a system and method for implementing a reliable touch screen display system having increased light transmissivness resistant to environmental contamination.

BACKGROUND ART

Personal Information Devices include the class of computers, personal digital assistants and electronic organizers that tend both to be physically smaller than conventional computers and to have more limited hardware and data processing capabilities. PIDs include, for example, products sold by Palm, Inc. of Santa Clara, Calif., under such trademark as Pilot, and Pilot 1000, Pilot 5000, PalmPilot, PalmPilot Personal, PalmPilot Professional, Palm, and Palm III, Palm V, Palm VII, as well as other products sold under such trade names as WorkPad, Franklin Quest, and Franklin Convey.

PIDs are generally discussed, for example, in U.S. Pat. Nos. 5,125,0398; 5,727,202; 5,832,489; 5,884,323; 5,889,888; 5,900,875; 6,000,000; 6,006,274; and 6,034,686, which are incorporated herein by reference. PIDs typically include a screen and data processor, allowing the PID user to operate a substantial variety of applications relating to, for example: electronic mail, a calendar, appointments, contact data (such as address and telephone numbers), notebook records, a calendar, expense reports, :to do lists: or games. PIDs also often include substantial electronic memory for storing such applications as well as data entered by the user. Due to their substantial variety of applications and uses, personal information devices are becoming increasingly widely used.

One important characteristic of personal information devices is the easy manner in which software applications and information are made available to the user. Many PIDs are equipped with touch screen displays. The touch screen displays are used to implement various user input and output schemes. Since PIDs and other similar palmtop computer systems are very small, keyboards are generally not efficient input devices. For example, PIDs with keyboards have keyboards that are so small that a user cannot touch-type. Furthermore, to use a keyboard a user must either place the PID system down onto a flat surface so the user can type with both hands or hold the PID system with two hands and type with thumbs only.

Thus, instead of using a keyboard, many PIDs employ a stylus and a touch screen or digitizer pad as an input system. The stylus and touchscreen combination works well for PIDs since the arrangement allows a user to hold the PID system in one hand while writing with the stylus onto the touchscreen with the other hand.

There is a problem, however, in that the mechanism for implementing the touch screen functionality tends to interfere with the transmission of light to an underlying display. Typical prior art touch screen displays employ a touch sensor mechanism overlaid on top of a display screen. The touch sensor mechanism detects user touches of its area, and translates such touches into appropriate inputs, such as, for example, icon manipulations, text entry, menu selections, and the like. The touch sensor mechanism is designed to be transparent to allow viewing of the underlying display screen. Unfortunately, prior art touch sensor mechanisms are not perfectly transparent. Prior art touch sensor mechanisms often allow only 60 percent or less of the impinging light to pass through to the underlying display screen. This leads to very dim displays. To overcome this characteristic, some manufacturers employ back lighting or front lighting of the display to compensate for the light attenuation of the touchscreen mechanism. This leads to excessive power consumption, decreased battery life, and overly large touch screen displays.

There exists an additional problem in that by combining a separate touchscreen mechanism and display screen to implement a touchscreen display, a seam necessarily exists between the mechanism and the screen. Although this seam can be sealed, it is still vulnerable to the entry of environment contaminants, such as dust, various liquids, etc. To improve the environmental seal, many manufacturers employ a beveled edge around the outsides of the touchscreen display, enclosing both the touchscreen mechanism and the display. Although the beveled edge improves the seal, environmental contaminants (e.g., dust, etc.) can still make their way around the edge and into the touchscreen display.

Thus, what is required is a solution that eliminates exposed seams of a PID. What is required is a solution which improves the transmission of light through the touchscreen mechanism, thereby improving the visibility of the display. The required solution should be inherently impervious to the entry of particulate contaminants and the like. The present invention provides a novel solution to the above requirements.

SUMMARY OF THE INVENTION

The present invention provides an integrated enclosure/touch screen assembly solution that eliminates exposed seams of a display of a hand-held electronic device. The present invention provides a solution which improves the transmission of light through the touchscreen mechanism, thereby improving the visibility of the display. The present invention is inherently impervious to the entry of particulate contaminants and the like.

In one embodiment, the present invention is implemented as an integrated enclosure/touch screen assembly for a PID. A touch screen assembly consisting of a display mechanism and optical sensor mechanism are enclosed within a single piece cover. The optical sensor mechanism consists of lens structure and optical sensor couple to the lens structure. The single piece cover includes a transparent top surface and the lens structure is embedded within the transparent top surface. The transparent top surface of the single piece cover is free of any steps or indentations which provides an enclosure that is both dust free and waterproof.

A soft thermoplastic material can be used for the single piece cover to allow activation of the optical sensor mechanism by means of mechanical contact applied to the transparent surface of the single piece cover. In one embodiment, the single piece cover is constructed by embedding the lens structure directly into the transparent surface. This process forms the flat outer surface for the single piece cover and also may be used to provide various shapes for the outer edges of the cover. The single piece cover eliminates exposed seams of the touch screen assembly. Additionally, the transparent surface is disposed directly above the display without any intervening layers, thereby improving the transmission of light to the display.

BRIEF DESCRIPTION OF THE DRAWINGS

The present invention is illustrated by way of example and not by way of limitation in the Figures of the accompanying drawings, in which like reference numerals refer to similar elements, and in which.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to obscure aspects of the present invention unnecessarily.

The present invention is directed towards an integrated enclosure/touch screen assembly solution that eliminates exposed seams of a display of a hand-held electronic device. The present invention provides a solution which improves the transmission of light through the touchscreen mechanism, thereby improving the visibility of the display. The present invention is inherently impervious to the entry of particulate contaminants and the like. The present invention and its benefits are further described below.

Figure 1:
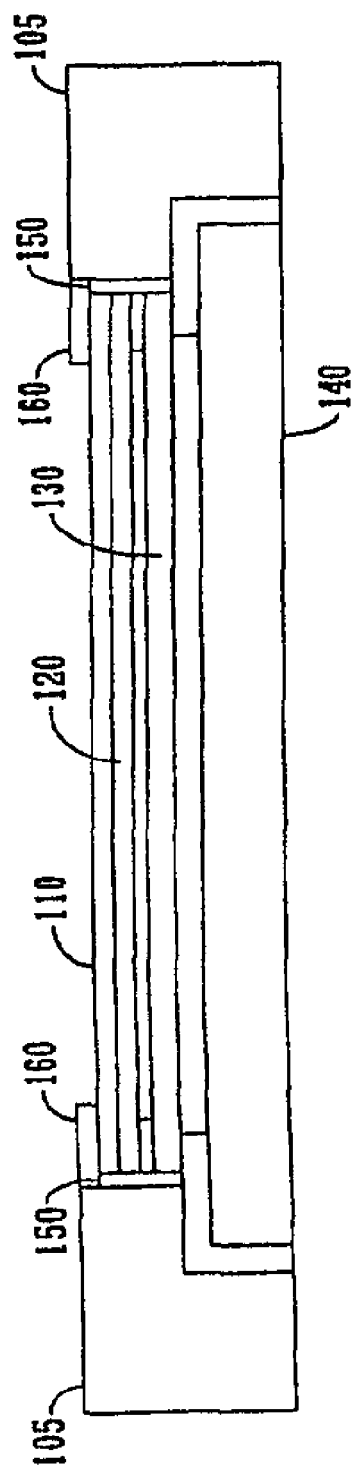
FIG. 1 is a cross-sectional view of an enclosure/touch screen assembly having multiple layers and having exposed edge seals protected by a beveled edge as utilized in prior art.

FIG. 1 is a cross-sectional view of an enclosure/touch screen assembly 100 utilized in prior art. The entire assembly is held in place by the supporting structure 105. The outermost protective film, or hard coat, 110 provides mechanical protection for the digitizer film 120. In addition, the outermost protective film is coupled to the support mechanism in order to provide a moisture and dust seal. The digitizing element 130 is located below and close to the digitizer film. An externally applied pressure that deflects the protective film will also deflect the digitizer film.

Any applied pressure great enough to cause the digitizer film to contact the digitizing element will then activate the digitizer mechanism. The display element 140 is located below the digitizer mechanism. User information is displayed on the upper surface of the display element. Together, the protective film, the digitizer film and the digitizing element must have an opacity small enough to allow viewing of the information displayed on the display element. The entire touch screen assembly is located within the support structure such that the surface of the outermost protective film is below the upper edge of the support structure. There is therefore a step-down corner 150 from the upper edge of the support structure to the surface of the outermost protective film and the resulting assembly exhibits a bezel like appearance. These step-down corners are dust and moisture collectors, are difficult to clean and frequently do not seal properly. Bevel edges 160 are provided to help seal the step down corners. However, even bevel edges 160 do not provide adequate protection.

Other types of touch screen assemblies employ integrated single piece covers, for example, soft thermoplastic polycarbonate material covers, to provide environmental seals against dust and moisture. Although such single piece covers are more effective at sealing out environmental contaminants, the many layers of material of the touch screen assembly (e.g., a protective single piece cover, digitizer film, digitizer element, etc.) tend to significantly decrease the amount of light that reaches the underlying display. Additional disclosure of integrated single piece covers can be found in, INTEGRATED ENCLOSURE/TOUCH SCREEN ASSEMBLY, U.S. patent application Ser. No. 09/774,990, by Slothower et al., filed Jan. 30, 2001.

Figure 2:
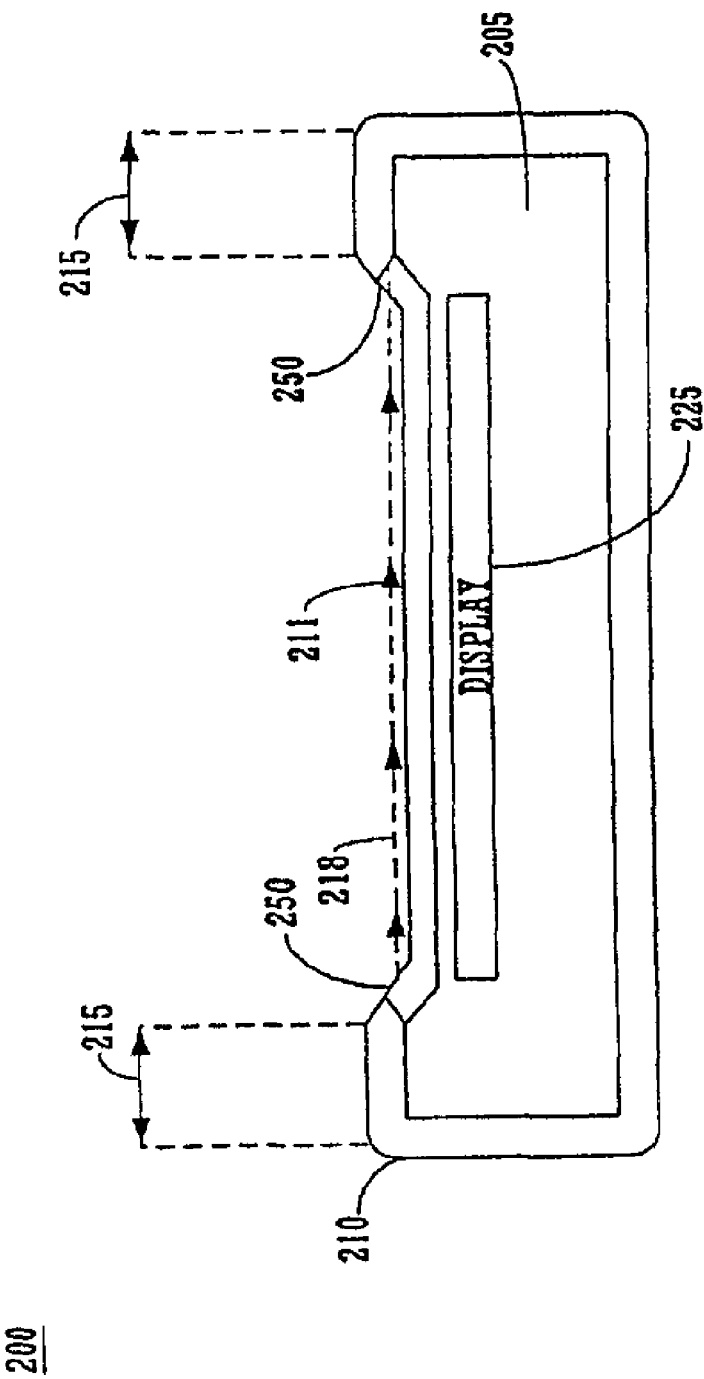
FIG. 2 shows a cross-sectional view of an embodiment in accordance with one embodiment of the present invention that does not have the exposed seals or the beveled edges as utilized in the prior art.

FIG. 2 shows a cross-sectional view of an embodiment 200 in accordance with one embodiment of the present invention, showing an integrated enclosure/touch screen assembly incorporating an optical lens structure for use with an optical sensor. In this embodiment, the single cover piece 210 incorporates an optical lens structure 250. In this embodiment, optical lens structure 250 columnates light transmitted parallel to surface of cover piece 210, as opposed to detecting pressure that deflects the surface, as in the embodiments described above. The light transmitted parallel to the surface of cover piece 210 is depicted as light beam 218 (e.g., dotted line 218). Contact with surface 210 interferes with light 218 transmitted between the optical lenses of lens structure 250, thereby allowing the accurate determination of the coordinates (e.g., x-y) of the contact (e.g., touch with a stylus or a finger).

A display 225 is disposed directly beneath cover piece 210. Cover piece 210 includes a transparent area 211 directly above the display. The transparent area 211, since it does not have to register contact, is optimized for its transparency. For example, transparent area 211 can be configured to transmit greater than 95 percent of the light impinging upon its surface to the underlying display 225. There are no intervening layers between area 211 and display 225. Accordingly, display 225 will have a much higher apparent brightness to a user since there are no intervening layers to further attenuate impinging light. A support structure 205 provides support for the cover piece 210 and display 225. An area 215 along the periphery of the transparent area 211 can be provided with in-mold decoration, for example, to distinguish the particular model of device 200, or the like.

Figure 3:
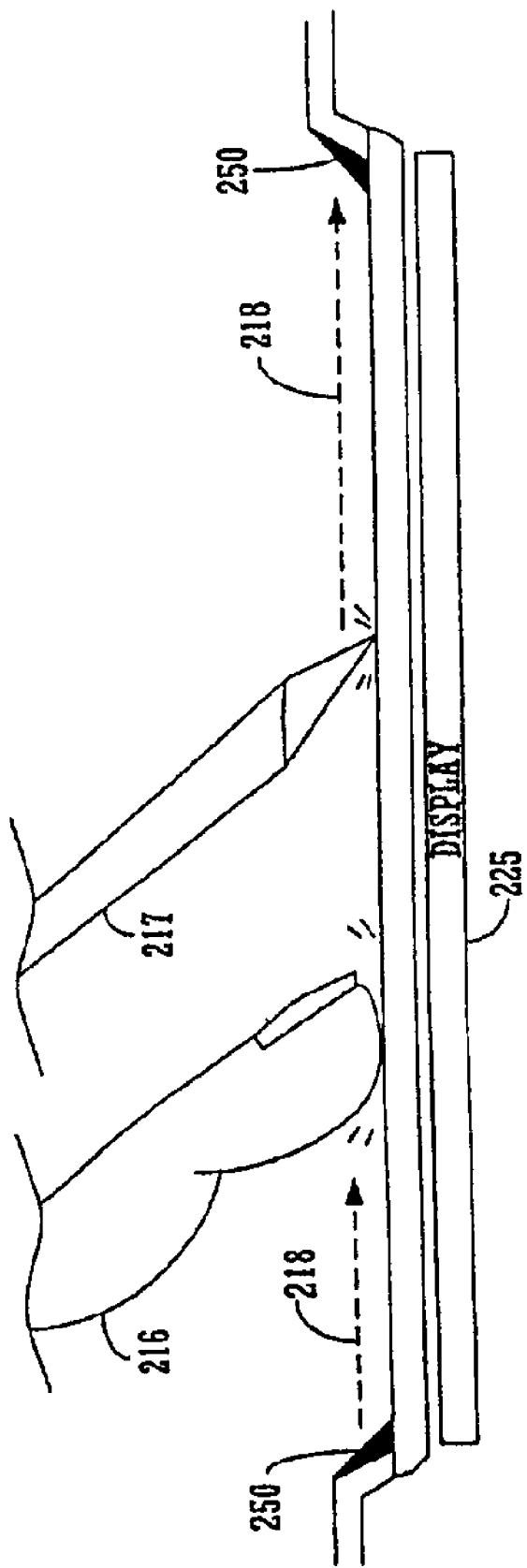
FIG. 3 shows a close up cross-sectional view of embodiment 200 in accordance with one embodiment of the present invention.

FIG. 3 shows a close up cross-sectional view of embodiment 200 in accordance with one embodiment of the present invention, a user's finger 216 or a stylus 217 in the process of actuating the touch screen, showing an integrated enclosure/touch screen assembly incorporating an optical lens structure for use with an optical sensor. As described above, optical lens structure 250 columnates light transmitted parallel to surface of cover piece 210. Light is transmitted parallel to the surface of cover piece 210 (e.g., dotted line 218). Contact with surface 210 interferes with light 218 transmitted between the optical lenses of lens structure 250, thereby allowing the accurate determination of the coordinates (e.g., x-y) of the contact with the finger 216 or the stylus 216.

Figure 4:
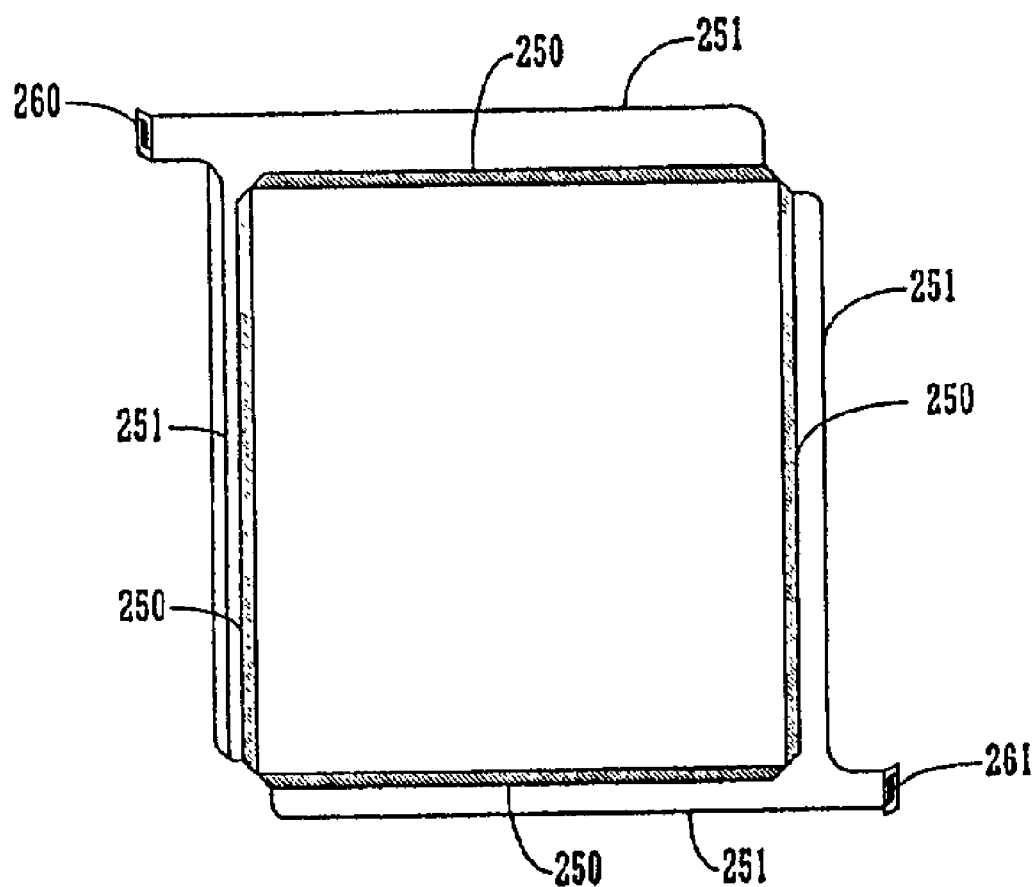
FIG. 4 shows a top-down view of the embodiment from FIG. 2 and FIG. 3 showing the transparent area, the optical lens structure, a light source, and an optical sensor according to an embodiment of the present invention.

FIG. 4 shows a top-down view of the embodiment 200 showing the transparent area 211, the optical lens structure 250, a light source 260, and an optical sensor 261. Light source 260 provides light to optical lenses of optical structure 250, which transmit light parallel to the surface of transparent area 211 to corresponding optical lenses on an opposite side of transparent area 211. Contact is detected when an object, such as, for example, a finger or a stylus, interferes with the light transmitted among the lenses of optical lens structure 250. Interferences with the light are detected by the coupled optical sensor 261. In this embodiment, a photodetector is used to implement optical sensor 261.

Figure 5:
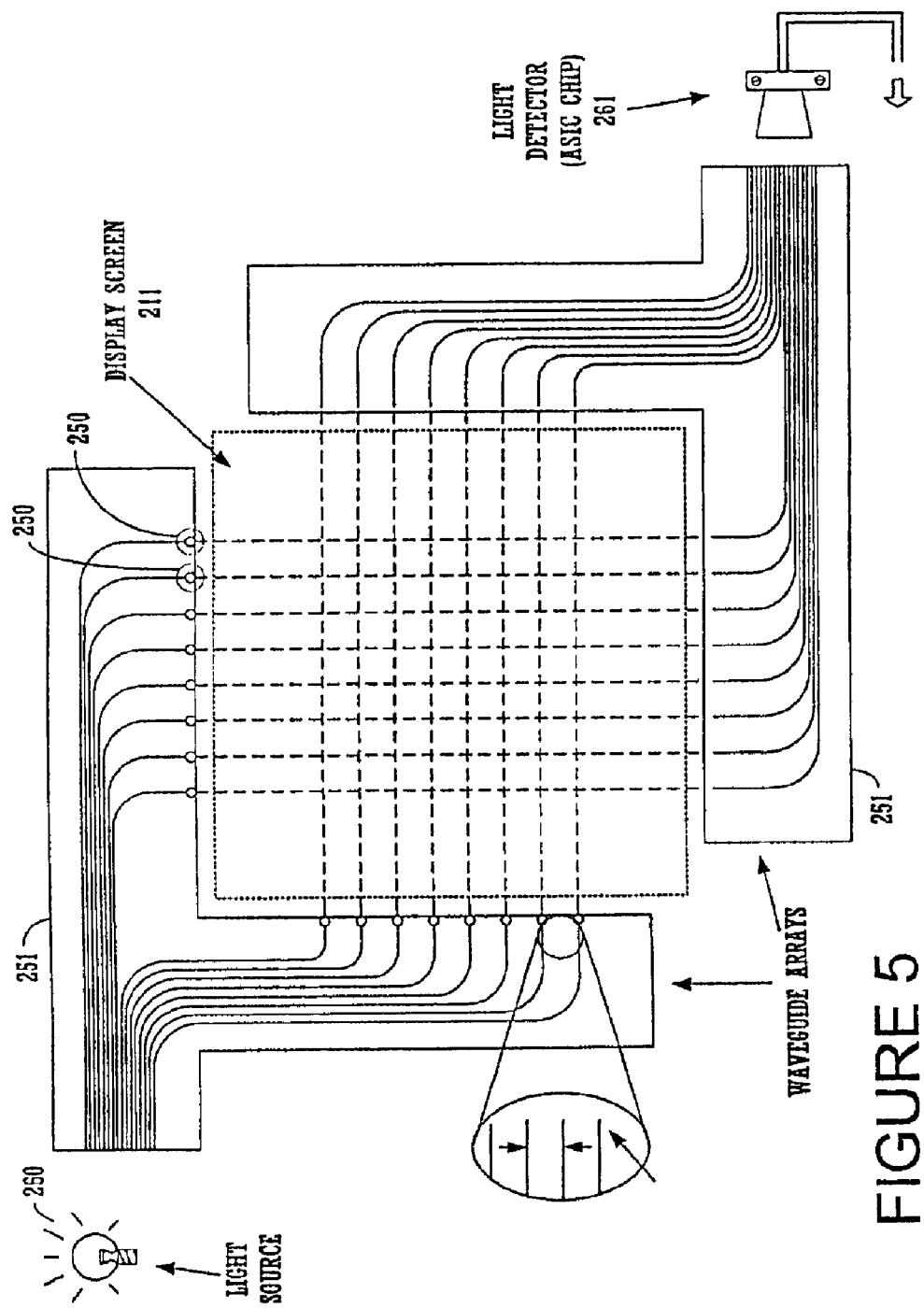
FIG. 5 shows a schematic top-down view of an optical sensor assembly, showing the lens structure in conjunction with the wave guides that couple the lens structure to the optical sensor, in accordance with one embodiment of the present invention.

FIG. 5 shows a schematic top-down view of an optical sensor assembly in accordance with one embodiment of the present invention. Optical lens structure 250 columnates light across the upper surface of cover piece 210 parallel to surface of cover piece 210, depicted as the horizontal and vertical dotted lines across transparent area 211 over the display. Contact with the surface of transparent area 211 creates a shadow and is thus detected by optical sensor/light detector 261. In this embodiment, the "grid" arrangement provided by optical lens structure 250 allows the accurate determination of the coordinates (e.g., x-y) of the contact (e.g., touch with a stylus or a finger). In this embodiment, optical lens structure 250 is embedded directly within cover piece 210, along the periphery of transparent area 211, thereby eliminating any seams through which contaminants might enter the assembly.

Thus, the present invention is directed towards an integrated enclosure/touch screen assembly solution that eliminates exposed seams of a display of a hand-held electronic device. The present invention provides a solution which improves the transmission of light through the touchscreen mechanism, thereby improving the visibility of the display. The present invention is inherently impervious to the entry of particulate contaminants and the like.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A touch screen display for a personal information device, comprising:
    an optical touch sensor;
    a display; and
    a single piece device enclosure integrated with the optical touch sensor, the single piece device enclosure having a transparent surface for viewing the display disposed beneath the transparent surface, the single piece device enclosure encasing the personal information device and including a lens structure for columnating light across the transparent surface, the optical touch sensor coupled to the lens structure to register contact with the transparent surface via the lens structure while the single piece device enclosure prevents contaminants from entering the personal information device.

2. The touchscreen display of claim 1 wherein the single piece device enclosure includes in mold decoration along a periphery of the single piece device enclosure.

3. The touchscreen display of claim 1 wherein the lens structure included within single piece device enclosure is coupled to the optical touch sensor to provide columnated light for detecting and registering contact with the transparent surface.

4. The touchscreen display of claim 3 wherein a plurality of waveguides are coupled to the lens structure and embedded within the single piece device enclosure.

5. The touchscreen display of claim 1 wherein the optical touch sensor detects and registers contact from a finger on the transparent surface.

6. The touchscreen display of claim 1 wherein the optical touch sensor detects and registers contact from a stylus on the transparent surface.

7. The touch screen display of claim 1 wherein the single piece device enclosure comprises a mylar polycarbonate material.

8. The touch screen display of claim 1 wherein the single piece device enclosure is bezel-less.

9. The touchscreen display of claim 1 wherein the transparent surface transmits more than 90 percent of light impinging upon the transparent surface to the display.

10. An integrated enclosure/touch screen assembly comprising:
    a display mechanism;
    an optical sensor;
    a lens structure coupled to the optical sensor;
    a single piece device enclosure that is bezel-less; and
    a supporting structure for supporting the display mechanism, the optical sensor, the lens structure, and the single piece device enclosure, wherein the lens structure and the single piece device enclosure form a single mechanical structure encasing for a personal information device and wherein the optical sensor can be activated by touching the external surface of the single piece device enclosure to disturb light received by the lens structure.

11. The integrated enclosure/touch screen assembly according of claim 10 wherein the single piece device enclosure includes a transparent surface and the display mechanism is disposed beneath the transparent surface.

12. The integrated enclosure/touch screen assembly according of claim 10 wherein finger contact on the transparent surface of the single piece device enclosure may be used to activate the optical sensor via the lens structure.

13. The integrated enclosure/touch screen assembly according of claim 10 wherein stylus contact on the transparent surface of the single piece device enclosure may be used to activate the optical sensor via the lens structure.

14. The integrated enclosure/touch screen assembly according of claim 10 wherein the single piece device enclosure includes a periphery area for in-mold decoration.

15. The integrated enclosure/touch screen assembly according of claim 10 wherein the optical lens structure is disposed along a periphery of the transparent surface of the single piece device enclosure.

16. A single piece portable electronic device comprising:
    a flat panel display screen;
    an optical sensor;
    a lens structure coupled to the optical sensor;
    a bezel-less transparent surface wherein the lens structure is embedded within the transparent surface to form a single mechanical device enclosure encasing the portable electronic device and wherein contact with the transparent surface is detected by the optical sensor detecting a shadow from the contact via the lens structure, and wherein the transparent surface is a single layer transparent surface configured to transmit more than 90 percent of light impinging upon the transparent surface to the display screen.

17. The display assembly from claim 16 wherein a wave guide structure couples the lens structure to the optical sensor.

18. The display assembly from claim 16 wherein the bezel-less transparent surface includes a peripheral area for in-mold decoration.

* * * * *